United States Patent [19]

Bertsch et al.

[11] Patent Number: 4,832,408
[45] Date of Patent: May 23, 1989

[54] UPHOLSTERY SUPPORT FOR A VEHICLE SEAT

[75] Inventors: Otto-Karl Bertsch, Schwäbisch; Thomas Amthor, Rosengarten-Westheim, both of Fed. Rep. of Germany

[73] Assignee: Keiper Recaro GmbH & Co., Fed. Rep. of Germany

[21] Appl. No.: 216,297

[22] Filed: Jul. 8, 1988

[30] Foreign Application Priority Data

Jul. 10, 1987 [DE] Fed. Rep. of Germany ... 8709523[U]

[51] Int. Cl.⁴ .............................................. A47C 7/02
[52] U.S. Cl. ............................ 297/460; 297/DIG. 2; 297/452
[58] Field of Search .................. 297/DIG. 2, DIG. 1, 297/460, 452, 448, 445

[56] References Cited

U.S. PATENT DOCUMENTS

| | | | |
|---|---|---|---|
| 3,182,377 | 5/1965 | Hoven et al. | 297/460 X |
| 3,627,378 | 12/1971 | Brock | 297/DIG. 2 |
| 3,904,273 | 9/1975 | Kostelec | 297/DIG. 2 |
| 4,088,367 | 5/1978 | Atkinson | 297/DIG. 2 |
| 4,671,570 | 6/1987 | Hockenberry | 297/DIG. 2 |

FOREIGN PATENT DOCUMENTS

| | | |
|---|---|---|
| 2303289 | 4/1979 | Fed. Rep. of Germany. |
| 1438905 | 6/1976 | United Kingdom. |
| 2158706 | 11/1985 | United Kingdom. |
| 2167291 | 5/1986 | United Kingdom. |

Primary Examiner—James T. McCall
Attorney, Agent, or Firm—Wigman & Cohen

[57] ABSTRACT

An upholstery support for a vehicle seat consisting of a first shell with a raised edge and made from a fiber-reinforced plastic and a second shell arranged on the side of the first shell facing the upholstery, which second shell is also made from a fiber-reinforced plastic, is connected with the first shell along the edge of the first shell, covers only portions of the first shell and is spaced from the first shell in predetermined areas. The second shell has a central cut-out and forms, together with the raised edge of the first shell, a hollow box-like frame and in both shells the reinforcing fibers are carbon fibers.

10 Claims, 4 Drawing Sheets

UPHOLSTERY SUPPORT FOR A VEHICLE SEAT

BACKGROUND OF THE INVENTION

The invention relates to an upholstery support for a vehicle seat and more particularly to an upholstery support having two shells joined together.

In a known upholstery support for this type (DE-AS No. 23 03 289) for a back rest of a vehicle seat, the upper and lower edges of the second shell, which like the first shell is made from a fiberglass-reinforced plastic, abut the first shell and are there securely connected thereto. The upper and lower edges of the second shell rest on the lateral edges of the first shell and are securely connected thereto. The center of the portion of the second shell that forms the upper shoulder support is provided with a downwardly extending cut-out, in order to improve the ratio of effective rigidity to weight. From its upper edge to its lower edge, the second shell maintains a distance from the first shell that initially increases and then again decreases, thus achieving an orthopedically correct support for the spinal column of the seat user and also achieving an increase in the torsional rigidity of the upholstery support.

SUMMARY AND OBJECTS OF THE INVENTION

The object of the invention is to create an upholstery support of the type dicussed above, in which a significantly improved ratio between weight and rigidity can be achieved. This object is achieved with an upholstery support having a first shell with a raised edge and made from a fiber-reinforced plastic, and having a second shell arranged on the side of the first shell facing the upholstery, which second shell is also made from a fiber-reinforced plastic, is connected with the first shell along its edges, covers only portions of the first shell and is spaced from the first shell in predetermined areas, wherein the second shell has a central cut-out and forms, together with the edges of the first shell, a hollow box-like frame, and in both shells the reinforcing fibers are carbon fibers.

The formation of a hollow box-type frame from the first and second shells results in a optimal ratio between rigidity and weight. Because carbon fibers are also provided as reinforcing fibers, the two shells have a minimal weight. The upholstery support according to the invention is therefore also particularly well-suited for an airplane seat.

Particularly advantageous is an embodiment in which the two shells have raised surrounding edges which are directed toward one another and rigidly connected together because in this manner the required light weight of the hollow box-like frame is achieved with a minimal edge height. Because the stiffening effect of the hollow box-like frame decreases as the distance from the outer edge of the upholstery support increases, and in addition, because as a rule the upholstery support is supposed to have a concave curvature in the lateral direction of the seat on the side facing the upholstery, in one preferred embodiment the hollow box-like frame has a wedge-shaped cross-section in the area of its two side beams, the height which decreases toward the inner edges of the second shell.

The transitional area to the raised edge of the second shell is advantageously rounded. This results, first of all, in lower loads on the material, and also avoids edges, which are undesirable or impermissible for safety reasons.

In the area of one or both lateral beams of the upholstery support it can be desirable to provide a constant spacing between the two shells. In this manner one achieves a maximal stability in these lateral beams, which, for example, are heavily loaded in a back rest.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
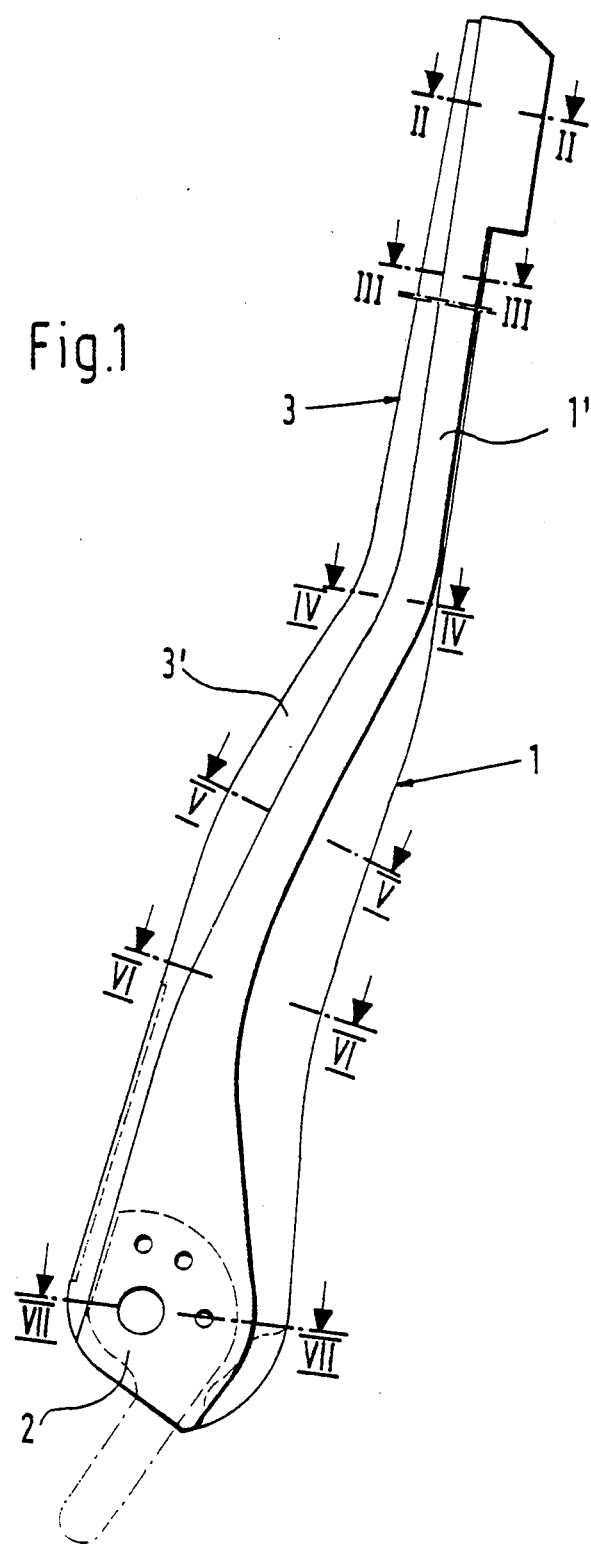
FIG. 1 is a side view of the exemplary embodiment.
Figure 2:
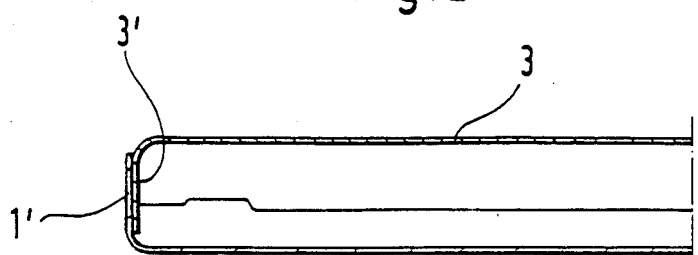
FIG. 2 is a partially illustrated section according to the line II—II in FIG. 1.
Figure 3:
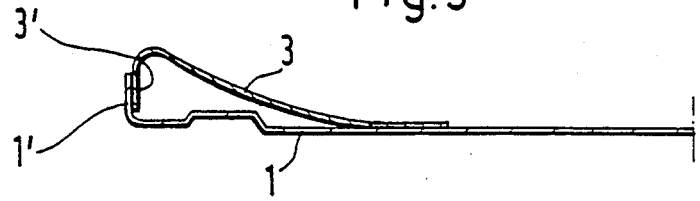
FIG. 3 is a partially illustrated section according to the line III—III in FIG. 1.
Figure 4:
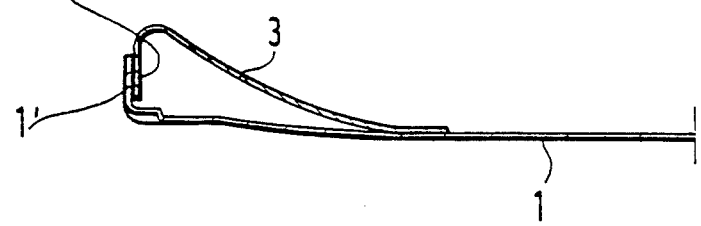
FIG. 4 is a partially illustrated section according to the line IV—IV in FIG. 1.
Figure 5:
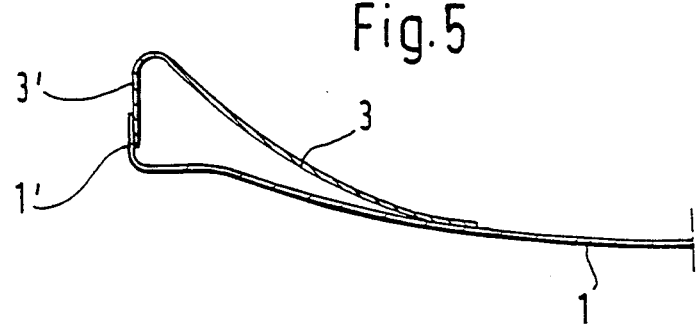
FIG. 5 is a partially illustrated section according to the line V—V in FIG. 1.
Figure 6:
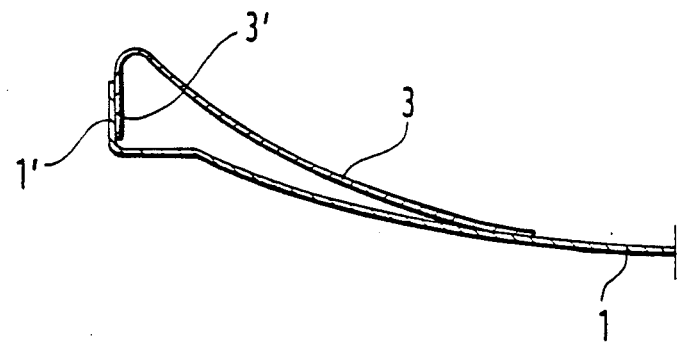
FIG. 6 is a partially illustrated section according to the line VI—VI in FIG. 1.
Figure 7:
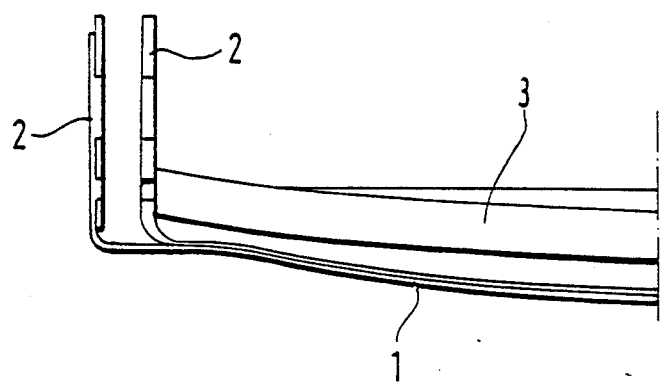
FIG. 7 is a partially illustrated section according to the line VII—VII in FIG. 1.

Referring now in detail to the drawings wherein like parts are designated by like reference numerals throughout, there is illustrated in FIG. 1 an upholstery support for the back rest of a vehicle seat, particularly an airplane passenger seat, which has a generally rectangular first shell 1, consisting of a plastic reinforced with carbon fibers. As shown in FIG. 1, the lower half of the first shell 1 is curved toward the upholstery support to form a support for the lower back. In addition, the lower half thereof is curved laterally, in order to give the seat user lateral support as well. The first shell 1, which is formed in one piece, has a raised, forwardly directed surrounding edge 1', as is shown with particular clarity in FIGS. 2 through 6. In addition, two spaced side plates 2 are arranged on the lower end on each side in order to receive respective hinge fittings. The two hinge fittings (not shown), the pivot axes of which align with each other, serve to connect the upholstery support with the seat frame.

Figure 8:
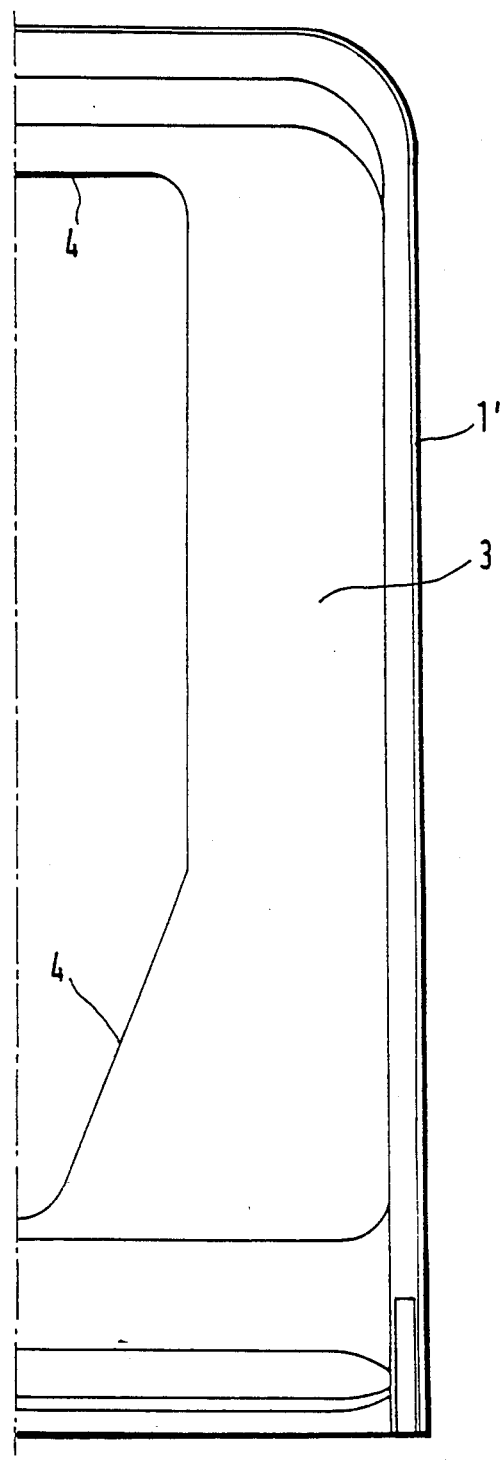
FIG. 8 is a partially illustrated elevational view of the front of the exemplary embodiment.

The upholstery support further includes a second shell 3, which also consists of a carbon fiber reinforced plastic. As shown particularly in FIG. 8, this second shell 3 has a large central cut-out, the upper and lower borders 4 of which run parallel to the upper and lower edges, respectively. The side borders 4 run parallel to the lateral edges in the upper portion. Only in the lower third does the distance of the borders 4 from the lateral edges continuously increase as they progress downward. As shown in FIGS. 2 through 6, the second shell 3 has a downwardly directed raised edge 3'. The transition to this edge 3' is severely rounded. As FIGS. 2 through 6 further illustrate, the edge 3' of the second shell 3 abuts the inside of the first shell and is rigidly connected thereto with an adhesive. Other types of connection, of course, are also possible. It is also possible, in addition to a full-surface connection, to provide individual connection elements, such as blind rivets.

The second shell 3, together with the first shell 1, forms a hollow box-like frame along its edge zones, giving the upholstery support a very high degree of stiffness. The upper lateral cross beam of this frame illustrated in section in FIG. 2 has a constant height over the entire width of the seat, i.e., the distance of the second shell 3 from the first shell 1 remains constant over the entire width of the seat. This provides a particularly high degree of stiffness in this upper cross beam.

In the area of the two side beams formed by the frame, said frame has a wedge-shaped cross-section, as shown in FIGS. 3 through 6. The distance of the second shell 3 from the first shell 1 decreases from the outside toward the boundary line 4. The inner edge zone of the second shell 3 abuts the first shell 1 and is rigidly connected thereto over its entire length, by an adhesive in this embodiment. As shown in FIGS. 3 through 6, the portion of the second shell 3 that forms the side beams has a concave curvature when viewed from the upholstery side, thus forming overall a laterally curved contact surface for the upholstery.

As shown in FIGS. 3 through 7, the first shell 1 has a varied curvature from top to bottom when viewed from the side of the seat. These Figs. also show that the first shell I can have reinforcing creases or bends in the area of the side beams.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An upholstery support for a vehicle seat comprising:
   a first shell with a raised edge and made from a fiber-reinforced plastic; and
   a second shell arranged on the side of the first shell facing the upholstery, which second shell is also made from a fiber-reinforced plastic, is connected with the first shell along the edge of the first shell, covers only portions of the first shell and is spaced from the first shell in predetermined areas, wherein:
   the second shell has a central cut-out and forms, together with the raised edge of the first shell, a hollow box-like frame; and
   in both shells the reinforcing fibers are carbon fibers.

2. The upholstery support according to claim 1, wherein the second shell has a raised surrounding edge directed toward the first shell, which edge abuts a raised surrounding edge of the first shell which is directed toward the second shell and is rigidly connected thereto.

3. The upholstery support according to claim 1, wherein the hollow box-like frame forms two side beams and has a wedge-shaped cross-sectional shape in the area of its two side beams, the height of which decreases toward the inner edges of the second shell.

4. The upholstery support according to claim 2, wherein the transition to the raised edge of the second shell is rounded.

5. The upholstery support according to claim 1, wherein the second shell is spaced apart from the first shell to form one cross beam, and the distance of the second shell from the first shell at least in the area of its one cross beam is constant, at least over nearly the entire length of said beam.

6. The upholstery support according to claim 2, wherein the hollow box-like frame forms two side beams and has a wedge-shaped cross-sectional shape in the area of its two side beams, the height of which decreases toward the inner edges of the second shell.

7. The upholstery support according to claim 6, wherein the transition to the raised edge of the second shell is rounded.

8. The upholstery support according to claim 2, wherein the second shell is spaced apart from the first shell to form one cross beam, and the distance of the second shell from the first shell at least in the area of its one cross beam is constant, at least over nearly the entire length of said beam.

9. The upholstery support according to claim 3, wherein the second shell is spaced apart from the first shell to form one cross beam, and the distance of the second shell from the first shell at least in the area of its one cross beam is constant, at least over nearly the entire length of said beam.

10. The upholstery support according to claim 4, wherein the second shell is spaced apart from the first shell to form one cross beam, and the distance of the second shell from the first shell at least in the area of its one cross beam is constant, at least over nearly the entire length of said beam.

* * * * *